US010050668B1

(12) United States Patent
Keiser et al.

(10) Patent No.: US 10,050,668 B1
(45) Date of Patent: Aug. 14, 2018

(54) INTEGRATED NETWORK DEVICES UTILIZING LOW-POWER TECHNOLOGIES

(75) Inventors: Luke Keiser, Frisco, TX (US); Scott Passe, Forney, TX (US)

(73) Assignee: Securus Technologies, Inc., Carrollton, TX (US)

( * ) Notice: Subject to any disclaimer, the term of this patent is extended or adjusted under 35 U.S.C. 154(b) by 1304 days.

(21) Appl. No.: 13/452,584

(22) Filed: Apr. 20, 2012

(51) Int. Cl.
H04B 3/54 (2006.01)

(52) U.S. Cl.
CPC ............... *H04B 3/54* (2013.01); *Y10S 307/01* (2013.01)

(58) Field of Classification Search
CPC ......... H04B 3/54–3/60; H04B 2203/00; H04B 2203/54; Y10S 307/01
USPC ............................................................ 307/1
See application file for complete search history.

(56) References Cited

U.S. PATENT DOCUMENTS

| 3,601,538 | A | * | 8/1971 | May | H04Q 11/02 |
| | | | | | 370/488 |
| 4,835,372 | A | * | 5/1989 | Gombrich | A61B 5/117 |
| | | | | | 235/375 |
| 6,011,579 | A | * | 1/2000 | Newlin | H04N 7/147 |
| | | | | | 348/14.08 |
| 7,317,793 | B2 | * | 1/2008 | Binder | H04M 19/08 |
| | | | | | 379/413 |
| 8,238,936 | B2 | * | 8/2012 | Nadler | H04W 64/00 |
| | | | | | 375/316 |
| 2002/0076038 | A1 | * | 6/2002 | Barrese | H04M 19/005 |
| | | | | | 379/413 |
| 2003/0184363 | A1 | * | 10/2003 | Lopata | G05F 3/24 |
| | | | | | 327/544 |
| 2004/0116140 | A1 | * | 6/2004 | Babbar | H04W 88/02 |
| | | | | | 455/517 |
| 2004/0128162 | A1 | * | 7/2004 | Schlotterbeck | G06F 19/325 |
| | | | | | 705/2 |
| 2005/0200456 | A1 | * | 9/2005 | Bridgelall | H04W 48/18 |
| | | | | | 340/10.1 |
| 2006/0009257 | A1 | * | 1/2006 | Ku | G01N 33/4972 |
| | | | | | 455/556.1 |
| 2006/0168458 | A1 | * | 7/2006 | Stineman, Jr. | H04L 12/10 |
| | | | | | 713/300 |
| 2006/0291493 | A1 | * | 12/2006 | Schley-May | H04L 12/10 |
| | | | | | 370/401 |

(Continued)

*Primary Examiner* — Jared Fureman
*Assistant Examiner* — Emmanuel R Dominique
(74) *Attorney, Agent, or Firm* — Fogarty LLP

(57) ABSTRACT

Systems and methods for integrated network devices utilizing low-power technologies are disclosed. In some embodiments, a method may include receiving, over one or more pairs of low-voltage wires (e.g., telephone wires, intercom wires, security system wiring, etc.), an electrical current sufficient to power an electronic device disposed within a controlled-environment facility (e.g., a jail, prison, etc.). The method may also include performing an electronic operation within the facility and transmitting, to a communication system serving the facility over the low-voltage wire(s), information related to the operation. In some implementations, the electronic device may be a mobile phone detection apparatus, a wireless access point, and/or a surveillance device. The method may also include, during a first time interval, using the electrical current to store a charge in a battery, and, during a second time interval, using the current in addition to the charge stored in the battery to perform the operation.

18 Claims, 4 Drawing Sheets

(56) References Cited

U.S. PATENT DOCUMENTS

| | | | | |
|---|---|---|---|---|
| 2007/0029975 A1* | 2/2007 | Martin | ................ | H02J 7/0068 320/134 |
| 2007/0200669 A1* | 8/2007 | McBride | ............... | B60R 25/245 340/5.72 |
| 2007/0263652 A1* | 11/2007 | Binder | .................... | H04B 3/54 370/436 |
| 2008/0005433 A1* | 1/2008 | Diab | ................... | G06F 13/4072 710/106 |
| 2008/0084117 A1* | 4/2008 | Sander | ..................... | H02J 7/35 307/46 |
| 2009/0003490 A1* | 1/2009 | Nadler | ................ | H04W 64/00 375/316 |
| 2009/0041004 A1* | 2/2009 | Emmanuel | ........ | H04L 12/40045 370/352 |
| 2009/0214108 A1* | 8/2009 | Yen | ......................... | G06K 9/38 382/163 |
| 2010/0061545 A1* | 3/2010 | Kitchin | .............. | H04M 19/005 379/413 |
| 2010/0237984 A1* | 9/2010 | Zenaty | .............. | G07C 9/00158 340/5.2 |
| 2011/0169950 A1* | 7/2011 | Weaver | .................... | H04N 7/18 348/143 |
| 2012/0137332 A1* | 5/2012 | Kumar | ............ | H04N 21/26606 725/62 |
| 2013/0179949 A1* | 7/2013 | Shapiro | .................. | H04L 51/12 726/4 |
| 2013/0194235 A1* | 8/2013 | Zanone | ................ | G06F 3/0418 345/175 |

* cited by examiner

INTEGRATED NETWORK DEVICES UTILIZING LOW-POWER TECHNOLOGIES

TECHNICAL FIELD

This specification relates generally to electronic devices, and, more particularly, to integrated network devices utilizing low-power technologies.

BACKGROUND

Telephone wires carry low-voltage, low-current electrical signals sufficient to power a simple telephone. The power needed to enable the additional functionality that is typically present in today's phones (e.g., liquid crystal displays, answering machine, etc.) is obtained using external power supply units or adaptors that are plugged into a standard electrical socket (e.g., a 110V AC plug). As the inventors hereof have recognized, however, there are environments where, although a telephone jack may be present, an accompanying electrical socket may not be available.

For instance, certain types of controlled-environment facilities (e.g., jails or prisons) may have telephone or intercom jacks disposed throughout the facility but without nearby AC sockets. In fact, the presence of high-voltage, high-current electrical installations distributed throughout the facility could present a potential danger to inmates and/or staff. Yet, as the inventors hereof have also recognized, these facilities may need to have specialized electrical devices deployed at specific locations. For example, a jail or prison may need to have mobile phone detectors, wireless access points, and video/audio surveillance strategically installed in selected areas. These devices may require more power than otherwise available over telephone wires, and, in some cases, may also need to have network communication connections. However, the cost and risks involved in the installation of AC or category (CAT) 5 outlets in these types of facilities are often prohibitive.

SUMMARY

Embodiments disclosed herein are directed to systems and methods for developing, manufacturing, deploying, providing, and/or operating integrated network devices that utilize low-power technologies. In an illustrative, non-limiting embodiment, a method may include receiving, over a pair of low-voltage wires, an electrical current sufficient to power an electronic device disposed within a controlled-environment facility. The availability of addition wire pairs may serve to increase the power capability of the system. The method may also include performing an electronic operation within the controlled-environment facility and transmitting, to a communication system serving the controlled-environment facility over the pair of low-voltage wires, information related to the electronic operation.

For example, the controlled-environment facility may be a jail or prison, and the pair of low-voltage wires may include telephone wires. In some implementations, the electronic device may include a mobile phone detection apparatus, the electronic operation may include detection of an unauthorized mobile phone, and the information may include a mobile phone detection alert. Additionally or alternatively, the electronic device may include a wireless access point, the electronic operation may include wireless transmission or reception of data to or from a computing device associated with a resident of the controlled-environment facility, and the information may include a content request issued by the resident through the computing device—in which case the method may further include receiving, from the communication system over the pair of low-voltage wires, fulfillment information corresponding to the content request, and wirelessly transmitting the fulfillment information to the computing device. Additionally or alternatively, the electronic device may include a surveillance apparatus, the electronic operation may include at least one of a video or audio surveillance operation, and the information may include at least one of a surveillance video or audio stream.

In some implementations, the method may include during a first time interval, using the electrical current to store a charge in a battery. The method may also include, during a second time interval subsequent to the first time interval, using the electrical current in addition to the charge stored in the battery to perform the electronic operation.

In another illustrative, non-limiting embodiment, a method may include receiving, over a single pair of low-voltage wires, an electrical current sufficient to power a processor-based system. The method may also include, during a first time period, using the electrical current to perform a low-power operation and to store a charge in a battery. The method may further include, during a second time period after the first time period, using the electrical current in addition to the charge stored in the battery to perform a high-power operation.

For instance, the system may be disposed within a jail or prison, and the single pair of low-voltage wires may include telephone wires, alarm system wires, intercom wires, etc. In some embodiments, the system may include a mobile phone detection apparatus, the low-power operation may include detection of a mobile phone within a first radius, and the high-power operation may include detection of a mobile phone within a second radius larger than the first radius. In other embodiments, the system may include a wireless access point, the low-power operation may include wireless transmission or reception of data to or from a computing device within a first radius, and the high-power operation may include wireless transmission or reception of data to or from a computing device within a second radius larger than the first radius. High-power operation may additionally be deployed for alternative applications and features (e.g., HD Video, subject lighting, 3-D Facial Recognition, and the like). Additionally or alternatively, the low-power operation may include wireless transmission or reception of data to or from a computing device using a first communication protocol or interface, and the high-power operation may include wireless transmission or reception of data to or from a computing device using a second communication protocol or interface different from the first communication protocol or interface. In yet other embodiments, the system may include a surveillance apparatus, the low-power operation may include an audio surveillance operation, and the high-power operation may include a video surveillance operation.

In yet another illustrative, non-limiting embodiment, a method may include, in a first mode of operation, using an electrical current received over one or more pairs of low-voltage wires to perform a low-power, electrical operation within a prison or jail, and to store a charge in a battery. The method may also include, in a second mode of operation, using the electrical current received over the one or more pairs of low-voltage wires in addition to the charge stored in the battery to perform a high-power, electrical operation within the prison or jail. The method may also include selecting the first mode of operation during a period of time of inmate inactivity within the jail or prison, and selecting the second mode of operation during a period of time of inmate activity within the jail or prison. The method may further include receiving a control signal over the one or more pairs of low-voltage wires, and selecting between the first or second modes of operation in response to the control signal.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for providing integrated network devices utilizing low-power technologies. Generally speaking, the various techniques described herein may find applicability in a wide variety of environments (e.g., residences, buildings, retail establishments, shopping malls, etc.). And, in some cases, these systems and methods may be particularly well-suited for deployment within controlled-environment facilities.

Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities. For instance, in some of the embodiments discussed below, a controlled-environment facility may be referred to as a jail or prison, and its residents may be referred to as arrestees, detainees, or inmates. It should be understood, however, that the systems and methods described herein may be similarly applicable to other types of controlled-environment facilities and their respective residents (e.g., a hospital and its patients).

Figure 1:
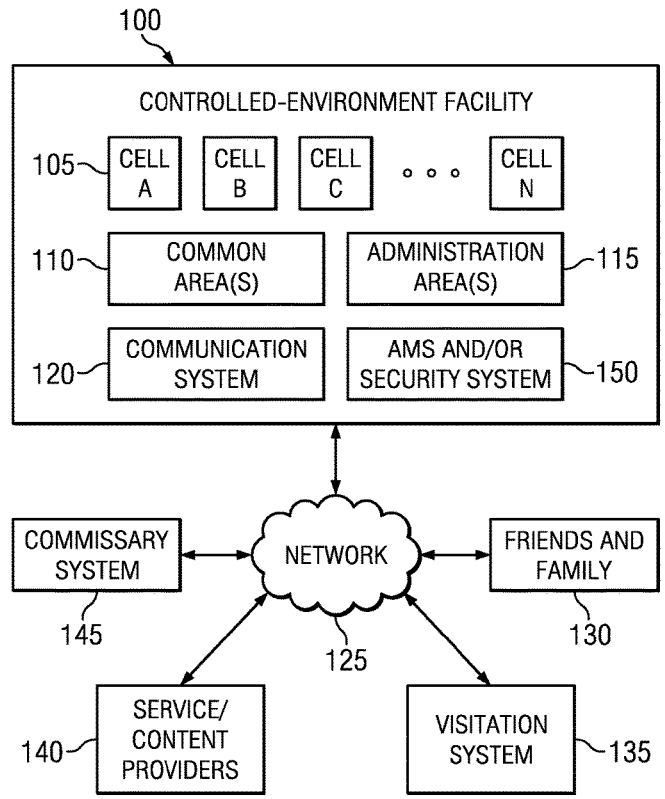
FIG. 1 is a diagram of an environment including a controlled-environment facility communication system according to some embodiments.

Turning now to FIG. 1, a block diagram of an environment including a controlled-environment facility 100 is depicted according to some embodiments. As illustrated, controlled-environment facility 100 (e.g., a prison or jail, etc.) includes cells A-N 105, common area(s) 110, and administration area(s) 115. Typically an inmate may reside within an assigned one of cells 105, and may occasionally or periodically be given access to common area(s) 110. Examples of common area(s) 110 include, but are not limited to, visitation rooms, cafeteria, kitchen, outdoor/exercise areas, etc. Meanwhile, administration area(s) 115 may include offices, security area(s), information technology (IT) rooms, etc. In some embodiments, one or more areas 105-115 within facility 100 may be equipped with a network of single pairs of low-voltage wires, such as, for example, telephone wires (e.g., two copper wires 24 American Wire Gage (AWG)), alarm system wires, intercom wires, etc. In some cases, each pair of low-voltage wires may terminate in the form of a telephone jack, connector, or the like.

Figure 2:
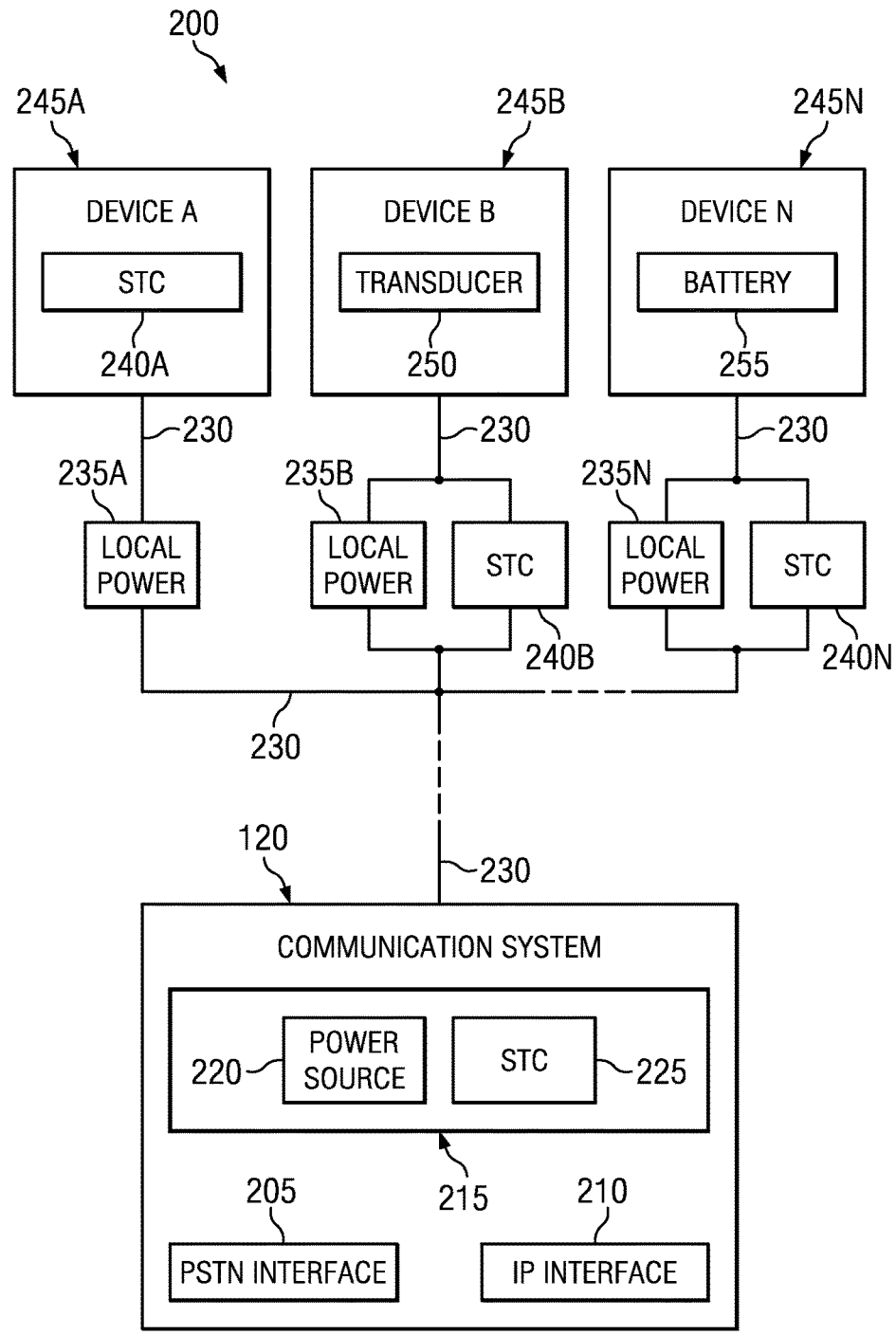
FIG. 2 is a block diagram of illustrative integrated network devices according to some embodiments.

In some embodiments, different types of electronic devices may be deployed within facility 100, as described in more detail with respect to FIG. 2. For example, electronic devices may include analog or digital telephones, computing devices, Voice over IP (VOIP) devices, cell phone detectors, wireless access points, electronic or information kiosks, video communication devices, surveillance apparatuses, etc. One or more of these devices may be accessible to residents of facility 100 and/or the facility's staff (e.g., prison staff, emergency response personnel, etc.). In various implementations, any number of electronic devices may be physically disposed within different areas of the same facility 100. Moreover, in some cases, these devices may be provided on a person, within a pod, module, cell, wing, service kiosk, visitation area, etc. that is generally accessible to inmates. Conversely, electronic device(s) may be placed on a person or in an office, control room, etc. that is ordinarily not accessible to inmates.

One or more of these electronic devices may be coupled to communication system 120, which serves facility 100 and may be configured to provide voice and data services to inmates and/or prison administration, such as, for example, voice, data, video, Internet access, etc. In some embodiments, communication system 120 may include conventional wired and/or wireless connectivity options, routing or switching capabilities, analog and digital voice interfaces, etc. Additionally or alternatively, communication system 120 may provide communication capabilities to one or more electronic devices within facility 100 over a network of single pair of low-voltage wires, as described in more detail below. As shown in FIG. 1, communication system 120 may be physically disposed within prison 100. In alternative embodiments, however, one or more of elements of communication system 120 may be located outside of prison 100.

To provide at least some of its services, communication system 120 may be configured to interface with network 125. Network 125 may in turn include any suitable wired or wireless/mobile network including, for instance, computer networks, the Internet, Plain Old Telephone Service (POTS) networks, third generation (3G), fourth generation (4G), or Long Term Evolution (LTE) wireless networks, Real-time Transport Protocol (RTP) networks, or any combination thereof. In some embodiments, at least portions of network 125 may implement a Voice-over-IP (VoIP) network or the like.

A number of different systems may be coupled to or otherwise accessible within facility 100 via communication system 120 over network 125. For example, friends and family communication devices 130 (e.g., telephones, computers, etc.) may be operable to connect to other electronic devices (e.g., visitation stations, etc.) within facility 100 under control of communication system 120. Visitation system 135 may provide certain video visitation services to inmates within facility 100. For example, visitation system 135 may implement scheduling, conflict resolution, user authentication, monitoring, and recording of remotely conducted video visitation sessions. Commissary system 145 may provide commissary goods to inmates within prison 100. As such, commissary system 145 may keep track of user accounts (e.g., balances on inmate trust accounts, commissary accounts, etc.) and may allow inmates to perform certain purchases and other transactions. Service/content providers 140 may include, for example, entities that provide medical services or deliver entertainment content (e.g., movies, TV shows, music, books, games, etc.) to inmates. For instance, in some cases, a content provider 140 may deliver entertainment content to a portable electronic or media player device operated by an inmate (e.g., a tablet computer or the like) at the inmate's request. Although illustrated as being outside of facility 100, one or more of elements of systems 130-145 may be located inside facility 100.

In addition to providing certain communication capabilities, communication system 120 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in administration and management system (AMS) or security system 150. In addition to PAC list(s), AMS 150 may also store inmate or resident profile data. As such, AMS 150 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, AMS or security system 150 may store security rules that are applicable to content requested by individual inmates or groups of inmates. For example, AMS 150 may store a list of a pre-approved content providers 140 (or blocked providers), a list of pre-approved websites (or blocked websites), allowed hours and/or duration of access, volume of data that can be requested by each inmate (e.g., per day, etc.), etc. Additionally or alternatively, AMS or security system 150 may be configured to manage, for example, wireless device detection operations performed within facility 100 (i.e., to detect use of cell phones and other wireless devices, whether the use is authorized or unauthorized) as well as surveillance operations (e.g., closed circuit cameras, etc.). As such, AMS 150 may control aspects of the operation of one or more electronic devices disposed within facility 100. For example, in some implementations, AMS 150 may issue commands that cause each such device to enter a particular mode of operation (e.g., "low-power" or "high-power"). These commands may be transmitted to each respective device through communication system 120 according to a predetermined schedule, triggering events (e.g., emergencies, riots, etc.), and/or manually by the facility's staff.

FIG. 2 is a block diagram of illustrative integrated network devices according to some embodiments. As illustrated, communication system 120 may be coupled to one or more of devices 245A-N disposed within facility 100 shown in FIG. 1. To provide communication services to devices 245A-N, communication system 120 may include PSTN interface 205 and/or IP interface 210. For example, a telephone call or other communication may be received through IP interface 210 or PSTN interface 205 requesting that it be routed to another phone or device. After a validation or security procedure (e.g., through AMS 150), communication system 120 may effect a connection to the desired phone number or communication device through IP interface 205 and/or PSTN interface 210 over network 125.

In addition, communication system 120 may include an extended signaling and electrical powering system 215 that allows communication system 120 to provide electrical power and/or communications to devices 245A-N over a network of single pairs of low-voltage electrical wires (e.g., telephone wires) 230. An example of extended signaling and electrical powering system 215 is described in U.S. Patent Publication No. 2010/0061545, titled "Extended Signaling System and Method," and which is hereby incorporated by reference herein in its entirety. Briefly, extended signaling and electrical powering system 215 may enable a source of electrical current ordinarily provided to enable use of a telephone over a single pair of low-voltage wires to deliver an additional amount of current over the same (sometimes existing) wiring. Extended signaling and electrical powering system 215 may also enable the exchange of telephony and non-telephony signals (e.g., data) between communication system 120 and devices 245A-N. As such, although a typical −48 VDC powered telephone line is only sufficient to provide about 25 mA of DC current to a local telephone or device, extended signaling and electrical powering system 215 may allow the same low-voltage level to deliver a current in excess of 25 mA using the same wiring while providing additional signaling and data communication capabilities.

In various embodiments, extended signaling and electrical powering system 215 may operate as a "front end" configured to filter DC and/or AC current(s) on a transmission channel to separate these signals and to pass the DC current through a low-pass filter (LPF). Extended signaling and electrical powering system 215 may also provide a high frequency (out-of-band) signaling capability isolated from the DC and audio channels by a high-pass filter (HPF) via signal transceiver and controller (STC) module 225. Additionally or alternatively, system 215 may provide an audio channel (e.g., in the speech frequency range) for telephony communications isolated from the DC path by a band-pass filter (BPF). As such, power source module 220 may be configured to deliver at least 40-60 mA or more to devices 245A-N (instead of the typical 25 mA current). Furthermore, system 215 may enable the additional current to be converted to a lower voltage but yet higher current, which is then made available to devices 245A-N over wires 230 (typically, each given one of devices 245A-N receives or is otherwise coupled to a corresponding single pair of wires). For example, in some implementations, power source module 220 may be capable of providing 100 mA or more at 5V to devices 245A-N over thousands of feet of standard telephone wire (or the like) in addition to signal transceiver and controller 225 providing one or more out-of-band signaling channels to enable data communication services.

Each of devices 245A-N may include or otherwise be coupled to different type of "back end" unit. These "back end" units may be configured to split the DC and AC currents into two or more DC current streams. One of those streams may provide sufficient current to power a typical telephone. Another stream(s) may provide sufficient electrical current to power one or more of devices 245A-N. The back end units may also split the AC signals into an audio channel (e.g., via a LPF) for telephony conversation purposes and into an out-of-band signaling channel (e.g., via a HPF) for signaling and/or data communication purposes.

For example, device 245A may receive an electrical current sufficient to support and/or enable its operation from local power 235A (e.g., provided via a telephone jack or the like). As illustrated, device 245A may include STC module 240A configured to enable signaling and/or data communications with other devices 245B-N and/or communication system 120 over single pair of low-voltage wires 230. In some cases, both local power module 235A and STC module 240A (i.e., the entire "back end" portion) may be included in device 245A. On the other hand, device 245B (and 245N) may receive both local power 235B (and 235N) and control or data communication capabilities via STC 240B (and 240N) from equipment external to device 245B (and 245N). For example, in some cases, components of local power 235B (and 235N) as well as components of STC module 240B (and 240N) may be built into a wall, provided by a distribution hub, etc.

In various embodiments, devices 245A-N may include devices that are disposed in particular locations within controlled-environment facility 100. For example, devices 245A-N may include wireless access points (WAP), mobile phone detectors, kiosks, and/or surveillance apparatuses that are generally positioned according to specific monitoring, range, and/or line-of-sight requirements. Again, these devices are ordinarily not capable of operating with the electrical power available through traditional telephone wires, and it may be impractical to add AC outlets to their installation locations. Accordingly, in some implementations, local power 235A-N may provide electrical current(s) sufficient to power electronic devices 245A-N over the single pairs of low-voltage wires 230. Moreover, these devices may not otherwise have access to wireless or wired data communication, and it may be similarly impractical to add CAT 5 cabling to their installation locations. Therefore, in some implementations, STC 240A-N may allow devices 245A-N to perform such communications, for example, via STC modules 240A-N over the single pairs of low-voltage wires 230.

In some embodiments, one or more of devices 245A-N may include a wireless transducer 250 (e.g., in the case of WAPs or cell phone detectors) and/or a battery 255. Transducer 250 may include an adjustable range (e.g., a radio-frequency and/or radiation pattern) that is configurable upon the amount of power available to device 245B. Moreover, battery 255 may be configured to store a charge, for example, based upon an amount of power provided by local power 235N that is not being consumed by device 245N. In some implementations, operation of these various components may be controlled in part by AMS 150. These and other operations are described with respect to FIG. 5 below.

Figure 3:
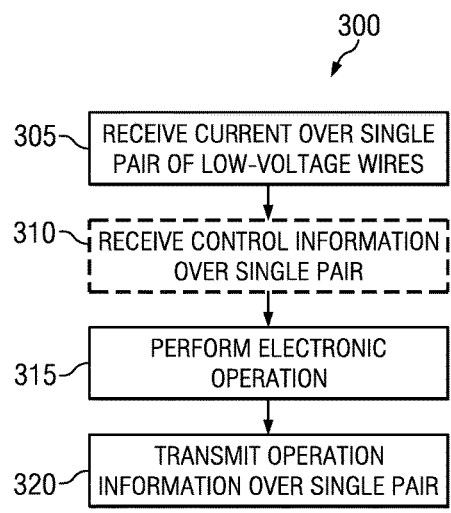
FIG. 3 is a flowchart of a method of operating a device over a single pair of low-voltage wires according to some embodiments.

FIG. 3 is a flowchart of a method of operating a device over a single pair of low-voltage wires. In some embodiments, method 300 may be performed, at least in part, by an electronic device (e.g., 245A-N) located within facility 100. At block 305, method 300 may include receiving an electrical current over a single pair of low-voltage wires (e.g., one of pairs of wires 230, shown in FIG. 2) sufficient to enable operation of the electronic device. At block 310, method 300 may optionally include receiving control information over the single pair of low-voltage wires. For example, prison administration 115 or AMS 150 may issue a command to activate or deactivate a particular mode of operation of the electronic device through communication system 120. In some cases, prison administration 115 may issue such a command using a computer or computing device connected to communication system 120 via an IP-based network (e.g., over Ethernet), and communication system 120 may convert that command using STC module 215 prior to transmitting it to a corresponding one of the electronic devices over the single pair of low-voltage wires.

At block 315, method 300 may include performing an electronic operation, for example, within facility 100. Then, at block 320, method 300 may include transmitting operation information over the pair of low-voltage wires, for instance, to facility administration 115 or AMS 150 via communication system 120. For example, if the electronic device includes a mobile phone detection apparatus, the electronic operation may include the detection of a mobile phone and the operation information may include a mobile phone detection alert.

Additionally or alternatively, if the electronic device includes a surveillance apparatus, the electronic operation may include at least one of a video or audio surveillance operation, and the operation information may include at least one of a surveillance video or audio stream (e.g., a live or recorded data stream). In either case, the availability of local electrical power and/or a communications medium via the single pair of low-voltage wires may facilitate the distribution of security devices across facility 100 for ubiquitous monitoring, surveillance, and/or detection.

Additionally or alternatively, if the electronic device includes a wireless access point, the electronic operation may include wireless transmission or reception of data to or from a computing device associated with an inmate of facility 100. In some facilities, one or more inmates may be allowed to use a tablet computer or the like for facility-approved purposes. For example, a particular inmate may be allowed to use his or her computing device to access a particular website, a content provider's entertainment catalog, commissary, visitation, or medical services, etc. via a wireless access point (e.g., device 245B). As such, the operation information may include a content request (e.g., Hypertext Transfer Protocol (HTTP) GET, etc.) issued by the resident through the computing device. This content request may be transmitted to communication system 120 over one of the pairs of low-voltage wires 230.

STC module 225 within communication system 120 may convert the content request to another protocol and may transmit that request, for example, to AMS 150 or another security gateway or the like via communication system 120 over an IP-based network (e.g., the facility's Intranet, etc.). The security gateway may be configured to examine the content request and ensure that it clears one or more security concerns associated with a given individual or facility. In response to the operation information having been cleared by AMS 150, communication system 120 may fulfill the underlying request (e.g., by querying one or more of systems 130-145). As such, STC module 225 within communication system 120 may again convert the resulting fulfillment information (e.g., requested data, denial of the request, etc.) for transmission over the pair of low-voltage wires 230. In such a case, method 300 may further include receiving, from communication system 120, fulfillment information corresponding to the content request over the pair of low-voltage wires 230. The wireless access point (e.g., 245B) may then wirelessly transmit the fulfillment information to the inmate's computing device (e.g., over BLUETOOTH®, Wi-Fi, etc.).

Figure 4:
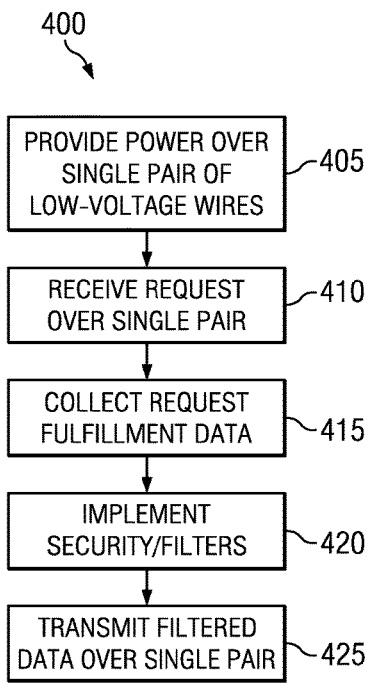
FIG. 4 is a flowchart of a method of providing power to a device over a single pair of low-voltage wires according to some embodiments.

FIG. 4 is a flowchart of a method of providing power to a device over a pair of low-voltage wires. In some embodiments, method 400 may be performed, at least in part, by communication system 120 located within facility 100. At block 405, the method may include providing power over a one or more pairs of low-voltage wires (e.g., wires 230 shown in FIG. 2) sufficient to enable operation of electronic device(s) 245A-N. At block 410, method 400 may include receiving a request over the pair of low-voltage wires. For example, communication system 120 may receive a content request from an inmate device as described above. At block 415, method 400 may include collecting fulfillment data corresponding to the request. For example, communication system 120 may retrieve requested content from one or more of systems 130-145.

At block 420, communication system 120 may consult AMS 150 or implement one or more security procedures and/or filters to ensure that the retrieved fulfillment data may be made accessible to a requesting inmate. For example, communications system 120 may include or otherwise be in communication with a security gateway configured to implement security rules with respect to individual inmates and/or the facility. For instance, in a case where the content request is directed to system 140, security filters or rules may include the exclusion of pornographic material, violent images or audio, a list of websites, etc. In cases where the content request is directed to commissary system 145, medical system 140, visitation system 135 and/or friends and family 130, communication system 120 may be configured to ensure, for example, that a given inmate is only allowed access to his or her own commissary or calling account, medical records, list of pre-approved contacts, etc.

Generally speaking, communication system 120 may be configured to communicate with other systems 130-145 through network 125, as well as with certain systems within facility 100 (e.g., AMS 250) using conventional data connections (e.g., Ethernet) and/or protocols. However, communication with one or more of devices 245A-N may be performed over the pair of low-voltage wires 230, thus greatly facilitating placement of these devices within facility 100 to effectively perform monitoring, detection, and data distribution. As the inventors hereof have recognized, these particular types of devices are unique, at least in part, because their positioning within facility 100 can be of critical importance for their successful operation. Also, it is not uncommon for one or more of devices 245A-N to be originally installed in a particular location but then moved after a period of use, for example, upon a determination that another location would be more convenient and/or effective. In other words, these types of devices may be relocated within facility 100 as part of the facility's normal operations. Moreover, it may be unfeasible to move both an AC outlet and a CAT 5 cable to each new device location; whereas existing telephone or intercom wiring may already be readily available and/or cost effective to install in the new area.

Figure 5:
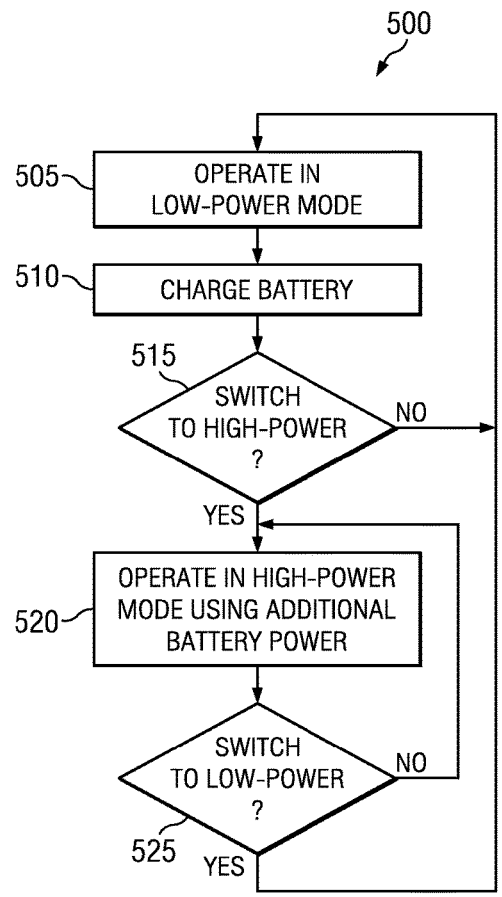
FIG. 5 is a flowchart of a method of operating a device in low- and high-power modes according to some embodiments.

FIG. 5 is a flowchart of a method of operating a device in low- and high-power modes. In some embodiments, method 500 may be performed, at least in part, by electronic devices 245A-N located within facility 100. At block 505, method 500 may include operating in a low-power mode. For example, electronic device 245N may operate using only the power provided by power source 220 through local power 235N over a single pair of low-voltage wires 230. At block 510, method 500 may include charging battery 255, at least in part, using a portion of local power 235N not employed by device 245N. For example, blocks 505 and/or 510 may take place during a period of relative inactivity (e.g., at night, during particular times of the day, during predetermined days of the week, etc.) depending upon the location of device 245N within facility 100.

At block 515, method 500 may include determining whether to switch to high-power operation. If not, control returns to block 505. Otherwise, the electronic device 245N may operate in high-power mode using the charge stored in battery 255 in addition to local power 235N received over single pair of low-voltage wires 230. For instance, block 520 may take place during a period of heavy use or activity within facility 100 (e.g., during the day, etc.) depending upon the location of device 245N within facility 100.

For instance, when device 245N serves as a cell phone detection device, the low-power mode of block 505 may detect mobile phones within a first radius, and the high-power operation of block 520 may provide detection of a mobile phone within a second radius larger than the first radius. When device 245N serves as a wireless access point, the low-power operation of block 505 may include a wireless transmission or reception of data to or from a computing device (e.g., an inmate media player, tablet computer, etc.) within a first radius, and the high-power operation of block 520 includes wireless transmission or reception of data to or from a computing device within a second radius larger than the first radius. Additionally or alternatively, the low-power operation of block 505 may include wireless transmission or reception of data using a first communication protocol or interface (e.g., BLUETOOTH®, ZIGBEE®, etc.) and the high-power operation of block 520 may include wireless transmission or reception of data using a second communication protocol or interface (e.g., Wi-Fi). Moreover, when device 245N serves as a surveillance apparatus, the low-power operation of block 505 may include an audio surveillance operation (e.g., using a microphone only), and the high-power operation of block 520 may include a video surveillance operation (e.g., using both a camera and a microphone, high-definition (HD) video, subject lighting, 3-D Facial Recognition, etc.). These high-power modes of operation may be made possible, at least in part, due to the battery power in addition to the electrical current delivered through the pair of low-voltage wires.

In some implementations, devices 245A-N may switch between low- and high-power operations based upon a status of a battery charge, a predetermined schedule, the electrical power available through local power module 235A-N, etc. Additionally or alternatively, devices 245A-N may receive a control signal over the single pair of low-voltage wires (e.g., from communication system 120 and/or AMS 150) and may select between the low and high-power modes of operation, at least in part, in response to the control signal.

Figure 6:
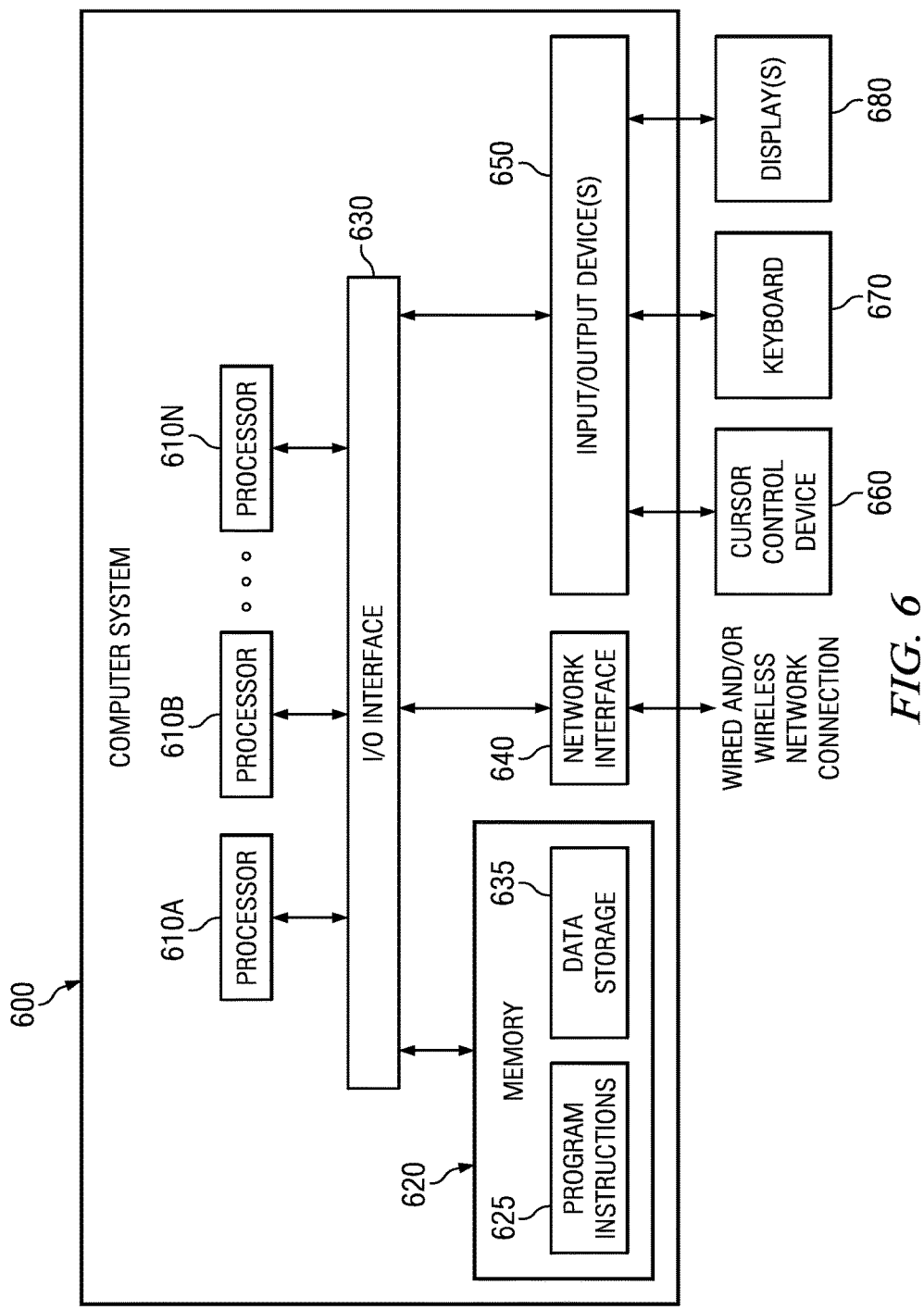
FIG. 6 is a block diagram of a computer system configured to implement various systems and methods described herein according to some embodiments.

As noted above, embodiments of systems and methods for deploying, providing, and/or operating integrated network devices that utilize low-power technologies may be implemented or executed by one or more computer systems. One such system is illustrated in FIG. 6. In various embodiments, system 600 may be a server, a workstation, a desktop computer, a laptop, a tablet computer, a mobile device, a smart phone, or the like. In some cases, system 600 may be used to implement communication system 120, AMS 150, systems 130-145, and/or one or more of devices 245A-N (e.g., a wireless phone detector, an video/audio surveillance apparatus, a wireless access point, etc.). For example, devices 245A-N may be implemented as dedicated processor-based, electronic devices similar to computer system 600. Additionally or alternatively, devices 245A-N may be implemented as integrated components of computer system 600 (e.g., as part of a tablet computing device or the like). In different embodiments, various similar systems may be configured to communicate with each other in any suitable way, such as, for example, via the single pair of low-voltage wires 230.

As illustrated, computer system 600 includes one or more processors 510 coupled to a system memory 620 via an input/output (I/O) interface 630. Computer system 600 further includes a network interface 640 coupled to I/O interface 630, and one or more input/output devices 650, such as cursor control device 660, keyboard 670, display(s) 680, and/or mobile device 690. Other devices 650 may include, for example, surveillance cameras, microphones, antennas/wireless transducers, phone detection modules, etc. In some embodiments, system 120 may be implemented using a single instance of computer system 600, while in other embodiments multiple such systems, or multiple nodes making up computer system 600, may be configured to host different portions of a given electronic device or system.

In various embodiments, computer system 600 may be a single-processor system including one processor 610, or a multi-processor system including two or more processors 610 (e.g., two, four, eight, or another suitable number). Processors 610 may be any processor capable of executing program instructions. For example, in various embodiments, processors 610 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 610 may commonly, but not necessarily, implement the same ISA. Also, in some embodiments, at least one processor 610 may be a graphics processing unit (GPU) or other dedicated graphics-rendering device.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described above in connection with FIGS. 3-5, may be stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a computer-accessible medium may include any tangible storage media or memory media such as electronic, magnetic, or optical media—e.g., disk or CD/DVD-ROM coupled to computer system 600 via I/O interface 630. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via wires 230.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. Network interface 640 may also support communications and/or signaling via signal pair of low-voltage wires 230.

Input/output devices 650 may, in some embodiments, include one or more display terminals, keyboards, keypads, touchpads, scanning devices, voice or optical recognition devices, mobile devices, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 625, configured to implement certain embodiments described herein, and data storage 635, comprising various data accessible by program instructions 625. In an embodiment, program instructions 625 may include software elements of embodiments illustrated in the above figures. For example, program instructions 625 may be implemented in various embodiments using any desired programming language, scripting language, or combination of programming languages and/or scripting languages (e.g., C, C++, C#, Java™, JavaScript™, Perl, etc.). Data storage 635 may include data that may be used in these embodiments (e.g., recorded communications, profiles for different modes of operations, etc.). In other embodiments, other or different software elements and data may be included.

A person of ordinary skill in the art will appreciate that computer system 600 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various systems and methods illustrated in the figures and described herein represent example embodiments of systems and methods for integrated network devices utilizing low-power technologies. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A system disposed within a correctional facility, comprising:
    at least one processor; and
    a memory coupled to the at least one processor, the memory configured to store program instructions executable by the at least one processor to cause the system to:
        receive, over a single pair of low-voltage signal wires, an electrical current sufficient to power the system;
        receive, over the single pair of low-voltage signal wires, control information for configuring a mode of operation of the system;
        configure the mode of operation of the system based on the control information;
        during a first time period, use the electrical current to perform a low-power operation and to store a charge in a battery; and
        during a second time period after the first time period, use the electrical current in addition to the charge stored in the battery to perform a high-power operation.

2. The system of claim 1, wherein the system is disposed within a jail or prison, and wherein the single pair of low-voltage signal wires includes telephone wires.

3. The system of claim 1, wherein the system is disposed within a jail or prison, and wherein the single pair of low-voltage signal wires includes alarm system wires.

4. The system of claim 1, wherein the system is disposed within a jail or prison, and wherein the single pair of low-voltage signal wires includes intercom wires.

5. The system of claim 1, wherein the system includes a mobile phone detection apparatus, wherein the low-power operation includes detection of a mobile phone within a first radius, and wherein the high-power operation includes detection of a mobile phone within a second radius larger than the first radius.

6. The system of claim 1, wherein the system includes a wireless access point, wherein the low-power operation includes wireless transmission or reception of data to or from a computing device within a first radius, and wherein the high-power operation includes wireless transmission or reception of data to or from a computing device within a second radius larger than the first radius.

7. The system of claim 1, wherein the system includes a wireless access point, wherein the low-power operation includes wireless transmission or reception of data to or from a computing device using a first communication protocol and interface, and wherein the high-power operation includes wireless transmission or reception of data to or from a computing device using a second communication protocol and interface different from the first communication protocol or interface.

8. The system of claim 1, wherein the system includes a surveillance apparatus, wherein the low-power operation includes an audio surveillance operation, and wherein the high-power operation includes a video surveillance operation.

9. A tangible computer-readable storage medium of a device disposed in a within a correctional facility having program instructions stored thereon that, upon execution by a computer system, cause the computer system to:
    in a first mode of operation, use an electrical current received over one or more pairs of low-voltage signal wires to perform a low-power, electrical operation within a prison or jail, and to store a charge in a battery;
    in a second mode of operation, use the electrical current received over the one or more pairs of low-voltage signal wires in addition to the charge stored in the battery to perform a high-power, electrical operation within the prison or jail; and
    switch between the first mode of operation and the second mode operation based on control information received over the one or more pairs of low-voltage signal wires.

10. The tangible computer-readable storage medium of claim 9, wherein the low-power operation includes detection of a mobile phone within a first radius, and wherein the high-power operation includes detection of a mobile phone within a second radius larger than the first radius.

11. The tangible computer-readable storage medium of claim 9, wherein the low-power operation includes wireless transmission or reception of data to or from a computing device within a first radius, with a first protocol, or via a first interface, and wherein the high-power operation includes wireless transmission or reception of data to or from a computing device within a second radius larger than the first radius, with a second protocol different from the first protocol, or with a second interface different from the first interface.

12. The tangible computer-readable storage medium of claim 9, wherein the program instructions, upon execution by the computer system, further cause the computer system to:

select the first mode of operation during a period of time of inmate inactivity within the jail or prison; and select the second mode of operation during a period of time of inmate activity within the jail or prison.

13. The tangible computer-readable storage medium of claim 12, wherein the program instructions, upon execution by the computer system, further cause the computer system to:

deactivate the device based on the received control information.

14. A method performed by a device disposed in a within a correctional facility, the method comprising:

using, in a first mode of operation, an electrical current received over one or more pairs of low-voltage signal wires to perform a low-power, electrical operation within a prison or jail, and to store a charge in a battery;

using, in a second mode of operation, the electrical current received over the one or more pairs of low-voltage signal wires in addition to the charge stored in the battery to perform a high-power, electrical operation within the prison or jail; and switching between the first mode of operation and the second mode operation based on control information received over the one or more pairs of low-voltage signal wires.

15. The method of claim 14, wherein the low-power operation includes detection of a mobile phone within a first radius, and wherein the high-power operation includes detection of a mobile phone within a second radius larger than the first radius.

16. The method of claim 14, wherein the low-power operation includes wireless transmission or reception of data to or from a computing device within a first radius, with a first protocol, or via a first interface, and wherein the high-power operation includes wireless transmission or reception of data to or from a computing device within a second radius larger than the first radius, with a second protocol different from the first protocol, or with a second interface different from the first interface.

17. The method of claim 14, further comprising:

selecting the first mode of operation during a period of time of inmate inactivity within the jail or prison; and selecting the second mode of operation during a period of time of inmate activity within the jail or prison.

18. The method of claim 17, further comprising:

deactivating the device based on the received control information.

\* \* \* \* \*